United States Patent [19]

Kolc et al.

[11] Patent Number: 4,517,005
[45] Date of Patent: May 14, 1985

[54] AMINOPHENOL UREASE INHIBITORS AND UREASE INHIBITED UREA BASED FERTILIZER COMPOSITIONS

[75] Inventors: Jaroslav F. Kolc, Randolph Township, Morris County; Michael D. Swerdloff, Parsippany; Milorad M. Rogic, Whippany, all of N.J.; Larry L. Hendrickson, Camillus, N.Y.

[73] Assignee: Allied Corporation, Morris Township, Morris County, N.J.

[21] Appl. No.: 502,401

[22] Filed: Jun. 8, 1983

[51] Int. Cl.³ ............................................... C05C 9/00
[52] U.S. Cl. ......................................... 71/28; 71/902
[58] Field of Search ............................... 71/11, 27–30, 71/902

[56] References Cited

PUBLICATIONS

M. M. Mishra and W. Flaig, "Inhibition of Mineralization Urea Nitrogen in Soil," *Plant and Soil 51*, pp. 301–309, (1979).
J. M. Bremner and L. A. Douglas, "Effects of Some Urease Inhibitors on Urea Hydrolysis in Soils," *Soil Sci. Soc. Amer. Proc., 37*, pp. 225–226, (1973).
J. M. Bremner and L. A. Douglas "Inhibition of Urease Activity in Soils," *Soil Biol. Biochem.*, 3, pp. 297–307 (1971).
R. L. Mulvaney and J. M. Bremner, "Use of p-Benzoquinone and Hydroquinone for Retardation of Urea Hydrolysis in Soils," *Soil Biol. Biochem.*, 10 (1978).
J. H. Quastel, "The Action of Polyhydric Phenols on Urease; the Influence of Thiol Compounds," *Biochem. J.* 27, pp. 1116–1122, (1933).
1978, CA vol. 89, Abst. #89:89455k, Matzel et al.
1979, CA vol. 90, Abst. #90:21340j, Oertal et al.
1979, CA, vol. 91, Abst. #91:122723p, Matzel et al.
1979, CA, vol. 91, Abst. #91:139619F, Heber et al.
1981, CA, vol. 94, Abst. #94:101951g, Vlek et al.
1981, CA, vol. 94, Abst. #94:139429f, Bayless et al.

*Primary Examiner*—Ferris H. Lander
*Attorney, Agent, or Firm*—Richard C. Stewart, II

[57] ABSTRACT

Novel urease inhibiting aminophenol compounds and urea based fertilizer compositions including such compounds, and methods and compositions for inhibiting the activity of urease through use of a urease inhibiting effective amount of one or more of the aforementioned aminophenol compounds.

34 Claims, No Drawings

AMINOPHENOL UREASE INHIBITORS AND UREASE INHIBITED UREA BASED FERTILIZER COMPOSITIONS

BACKGROUND OF THE INVENTION

1. Field of the Invention

This invention relates to aminophenol urease inhibitors and urease inhibited urea based fertilizer compositions. More particularly, this invention relates to urease inhibited urea based fertilizer compositions which contain certain aminophenol compounds as urease inhibitors, and to methods and compositions for inhibiting the catalytic activity of urease through use of such aminophenol compounds.

2. The Prior Art

It is well known in the art to use urea and urea compositions in fertilizers, for application to the soil. The effective life of such fertilizers, however, is of short duration wherever microbiological activity exists in the soil to which the fertilizer is applied. This is due to the fact that urea is hydrolyzed rapidly, and nitrogen is lost in the form of ammonia, when urea is placed under or on the surface of soil which contains urease.

Urease, a crystallizable enzyme occurring in numerous bacteria and fungi, as for example *Micrococcus urease,* catalyzes the conversion of urea into ammonia and carbon dioxide. The reactions are as follows:

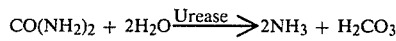

A portion of the ammonia thus formed is held by absorbing constituents of the soil and is available to plants as nutrient. However, a large amount of the ammonia may be lost to the air. A further problem resulting from the action of urease is the rapid accumulation of ammonium in the soil which may result in damage to germinating seedlings and young plants.

One approach to the reduction of problems resulting from the activity of soil urease toward soil applied urea is to find compounds that inhibit urease activity when applied to soils in conjunction with fertilizer urea. This approach has received considerable attention, and several classes of compounds have been used. For example, Mishra, M. M. and Flaig, W., "Inhibition of Mineralization of Urea Nitrogen in Soil", *Plant and Soil* 51, pp. 301–309 (1979) discloses that 1,4-naphthoquinone; 2-methyl-1,4-naphthoquinone; 2,3-dichlorohydroquinone; 4,6-di-tert-butyl-o-benzoquinone; 4-tert-butyl pyrocatechol and 4,6-di-tert butypyrocatechol inhibit urease activity and nitrification. Similarly Bremner, J. M. and Douglas, L. A. "Effects of Some Urease Inhibitors in Urea Hydrolysis in Soils", *Soil Sci. Soc. Amer. Proc.,* 37, pp. 225–226 (1973) reported that 2,5-dimethyl-p-benzoquinone, catechol, p-benzoquinone, hydroquinone, phenylmercuric acetate, N-ethylmaleimide, sodium p-chloromercuribenzoate, and acetohydroxamic acid, retard urea hydrolysis in soils and reduce gaseous loss of urea nitrogen. Also, Bremner, J. M. and Douglas, L. A. "Inhibition of Urease Activity in Soils", *Soil Biol Biochem.,* 3, pp. 297–307 (1971), Mulvaney, R. L. and Bremner, J. M., "Use of p-Benzoquinone and Hydroquinone for Retardation for Urea Hydrolysis in Soils", *Soil Biol Biochem.,* 10, pp. 297–302 (1978), and Quastel, J. H., "The Action of Polyhydric Phenols on Urease; the Influence of Thiol Compounds", Biochem. J. 27, pp 1116–1122 (1933), disclose the use of various polyhydroxy aromatic compounds as urease inhibitors.

SUMMARY OF THE INVENTION

In accordance with the present invention, there is provided a unique fertilizer composition comprising urea of a urea precursor compound which is capable of forming urea in situ when subjected to the use conditions of the composition and a "urease inhibiting effective amount" of one or more aminophenol compounds of the formula:

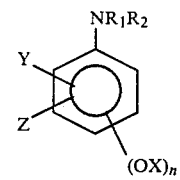

and acid salts thereof,
wherein:
n is 1, 2 or 3;
X is hydrogen or a metal cation;
Z and Y are the same or different and are hydrogen, alkyl, aryl, heterocycle, nitro, cyano, halogen, carboxy, carbamyl, alkylmercapto, trihalomethyl, mercapto, hydroxy, amino, sulfonic acid, alkylamino, dialkylamino, or phenoxy substituents; or Z and Y together may form an alkylene or alkenylene chain which may optionally include one or more heteroatoms of divalent oxygen, nitrogen or sulfur to form a fused or spiro aliphatic, aromatic or heterocyclic ring structure; and
$R_1$ and $R_2$ are the same or different and are hydrogen, or substituted or unsubstituted alkyl or phenyl wherein permissible substituents are one or more halogens, nitro, alkoxy, cyano, aryloxy, acyloxy, amido, mercapto, alkylmercapto, arylmercapto, thiocyano, carboxy, quaternary ammonium radical, amino, alkylamino, dialkylamino, bis-carboxyalkyl, alkylcarbonyl, carboxyalkyl, arylcarbonyl or alkoxycarbonyl, or $R_1$ and $R_2$ together may form an alkylene or alkenylene chain optionally including one or more divalent heteroatoms of oxygen, sulfur or nitrogen completing a 3, 4, 5 or 6 membered ring structure, or $R_1$, $R_2$ and N together form an iminoaliphatic, iminocycloaliphatic or iminoaromatic group. Hereinafter, "aminophenol" will be used to refer to the compounds of the above-referenced structural formula.

Another aspect of this invention relates to a method of enhancing the yield and/or growth of plants by distributing the composition of this invention to the "plant growth media" in which the plants are being grown within reach of the root system of the plants (hereinafter referred to as "root zone"). As used herein, the term "plant growth media" refers to the various natural and artificial media which support plant growth, including but not limited to soil, potting mixtures of organic and inorganic matter, and artificial media such as polyurethane foam.

Yet another aspect of this invention relates to a method of inhibiting the urease catalyzed hydrolysis of urea at some situs, such a plant growth media which comprises applying a "urease inhibiting effective amount" of one or more of the above-mentioned aminophenol compounds at the situs or in plant growth media prior to, after or in conjunction with the application of urea thereto. Still another aspect of this invention relates to a composition comprising a "urease inhibiting effective amount" of one or more of such aminophenol compounds useful for carrying out such method. As used herein, a "urease inhibiting effective amount" is an amount of such aminophenol compounds which when applied to a plant growth media or other situs is capable of inhibiting the urease catalyzed hydrolysis of urea applied to said situs or media to any extent.

It has been discovered that by distributing a urease inhibiting effective amount of one or more of the aforementioned aminophenol compounds in the said plant growth media or at some other situs, the urease catalyzed hydrolysis of urea to ammonia is suppressed, thereby retarding the rate at which urea is lost from the media or other situs. Furthermore, by proper distribution of the one or more aminophenol compounds in the plant growth media or other situs, this action of inhibiting the hydrolysis of urea to ammonia is effective over a prolonged period of time.

DETAILED DESCRIPTION OF THE INVENTION

The application of a urease inhibiting effective amount of one or more of the above-identified aminophenol compounds to a plant growth media or other situs, or incorporation of said amount into a composition are essential for the practice of this invention. While the amino phenol compounds can be used to inhibit the action of urease at many different situs, they are preferred for use in inhibiting the activity of urease in a plant growth media. In these preferred embodiments of the invention, the amount of the one or more aminophenol compounds applied to the plant growth media is at least about 0.01 parts of said one or more aminophenol compounds per million parts of said plant growth media. Hereinafter the abbreviation "p.p.m." will be used to refer to parts by weight of one or more aminophenol compounds per one million parts by weight of plant growth media. In the preferred embodiments of this invention, the amount of said one or more aminophenol compounds distributed in said plant growth media is from about 0.01 to about 5000 p.p.m., and in the particularly preferred embodiments is from about 0.1 to about 1000 p.p.m. Amongst these particularly preferred embodiments, most preferred are those embodiments in which the amount of said one or more aminophenol compounds distributed in said plant growth media is from about 1 to about 500 p.p.m.

Within the above referenced limits, the particular amounts of one or more aminophenol compounds used are dependent upon the particular situation. Thus, in determining the amount to be employed, consideration is made not only of the treatment need, i.e., soil pH, temperature, soil type, etc., but also of the mode of application to soil. When the one or more aminophenol compounds are applied in a broadcast application, the amount in p.p.m. may frequently be less than in row or band applications where, for a substantial depth and width within the vicinity of application, there can be a very high concentration of the one or more aminophenol compounds. When application is made near the root zone of growing plants, or when application is made immediately prior to seeding or transplanting, the amounts supplied are frequently at a lower rate than when application is made at the end of the growing season to prepare the soil for the following season. By dispersing very large dosages in growth media, a prolonged inhibition of the activity of urease can be obtained over a period of many months. The concentration of the one or more aminophenol compounds is eventually reduced to a minimum by decomposition in the soil.

In one method for carrying out the present invention, the one or more aminophenol compounds are distributed throughout the plant growth media in a broadcast application, such as by spraying, dusting, distribution in irrigation water, and the like. In such application, the one or more aminophenol compounds are supplied in amounts sufficient to permeate the growing area or root zone of the plant growth medium with a urease inhibiting effective amount of such aminophenol compounds. In field administration, the one or more aminophenol compounds can be distributed in the plant growth media in the amount and through such cross-section of the media as to provide for the presence therein of a urease inhibiting effective amount of the compounds. It is usually preferred that the one or more aminophenol compounds be distributed to a depth of at least two inches below the surface of the plant growth media.

In another method for carrying out the present invention, the one or more aminophenol compounds are administered to the plant growth medium in a band or row application. In such application, administration is made with or without carrier in amounts sufficient to supply to soil or plant growth medium a urease inhibiting effective amount of the one or more aminophenol compounds which can be as high as 5000 ppm or more. After administration with or without discing or dragging, subsequent irrigation or rainfall distributes the one or more aminophenol compounds throughout the growth medium.

In yet another embodiment of the present invention, the one or more aminophenol compounds are distributed throughout the plant growth media prior to seeding or transplanting the desired crop plant.

In still another embodiment of the invention, the plant growth media in the root zone of growing plants is treated with the one or more aminophenol compounds in an amount effective to inhibit the activity of urease that may be present in the media, but sublethal to plant growth. By following such practice, no adverse effect is exerted by the one or more aminophenol compounds upon growth of seeds or plants. Oftentimes, it is desirable to treat the plant growth media adjacent to plants, and this procedure may be carried out conveniently in side-dressing operations.

In a further embodiment of the invention, the plant growth media can be treated with the one or more aminophenol compounds following harvest to prevent rapid loss of urea. Such practice conserves the soil nitrogen for the following growing season. In such application, the upper limit is primarily an economic consideration.

In an additional embodiment, the plant growth media is treated with one or more aminophenol compounds in conjunction with the application of urea or a compound capable of forming urea in situ on application to the plant growth media. The amount of one or more aminophenal compounds employed in such embodiments should, in general, be sufficient to substantially inhibit the hydrolysis of all or a portion of the urea at the situs of application to ammonia.

The present invention can be carried out by distributing the one or more aminophenol compounds in an unmodified form through growth media. The present method also embraces distributing one or more such compounds as a constituent in liquid or finely divided solid compositions. The concentration of one or more aminophenol compounds in compositions to be employed for the treatment of growth media is not critical and can vary considerably provided the required dosage of effective agent is supplied to the growth media. In general, good results are obtained with liquid or solid compositions containing at least about 0.00001 percent by weight of the one or more aminophenol compounds based on the total weight of the composition. Usually the amount of the aminophenol compounds included in the said composition is from about 0.00001 to about 98 percent by weight of composition. In the preferred embodiments of the invention, the amount of one or more aminophenol compounds in the composition is from about 0.002 to about 50 weight percent and in the particularly preferred embodiments is from about 0.01 to about 20 weight percent on the aforementioned basis. Liquid or dust compositions in which the one or more aminophenol compounds is present in higher concentration can be utilized as such or can be employed as concentrate compositions to be diluted to prepare actual treating compositions.

In such practice the composition of the one or more aminophenol compounds can be modified with one or more additaments or soil treating adjuvants as for example urea, and/or the urea precursor compounds capable of forming urea in situ on application to the plant growth media. Urea is a well known, commercially available compound and will not be discussed herein in detail. Illustrative of compounds which are believed to form urea on addition to the soil and are water soluble and formaldehyde condensation products, as for example, methylolureas, methyleneureas and mixtures thereof. These products and a method for their preparation are described in detail in U.S. Pat. No. 3,462,256. Still other useful sources of urea are water-insoluble urea formaldehyde condensation products such as ureaform. Illustrative of useful water-insoluble urea and formaldehyde condensation products are those whose preparation and use are described in detail in U.S. Pat. Nos. 3,677,736 and 4,033,745.

The amount of urea or urea precursor compounds included in the composition of this invention is not critical to the unique advantages thereof, and any amount of urea or precursor compounds contained in conventional fertilizers can be used. Normally, the amount employed will vary widely depending on a number of factors, including the times and frequency of application. In the preferred embodiments of the invention, the quantity of urea or urea precursor compound may vary from about 0.5 to about 95 weight percent based on the total weight of the composition and in the particularly preferred embodiments may vary from about 1 to about 50 weight percent on the same basis. In the most preferred embodiments of this invention, the quality of urea or urea precursor compound will vary from about 3 to about 40 weight percent on the aforementioned basis.

The composition of this invention may include other optional ingredients known to those of skill in the art for inclusion in fertilizer compositions. For example, the composition may include sources of potassium, sulfur, phosphorus, boron, zinc, iron, manganese, copper, molybdenum, cobalt and like micronutrient and macronutrients which may be deficient in the soil. The composition may also include plant growth regulators, as for example auxins, cytokinins and the like, as well as pesticides, such as insecticides, miticides, herbicides, nematocides and the like. Moreover, the fertilizer composition may include other sources of nitrogen, as for example ammonium nitrate, or other materials to enhance nitrogen utilization as for example other urease inhibitors and nitrification inhibitors. Other optional materials include water, petroleum distillates or other liquid carriers, surface-active dispersing agents, inert finely divided solids and other fertilizers, as for example, reduced nitrogen fertilizers. Preferred adjuvants are surface-active dispersing agents, inert finely divided solids, and especially, urea and/or one or more urea precursor compounds, these adjuvants cooperate with the one or more aminophenol compounds so as to facilitate the practice of the present invention and to obtain an improved result. Depending upon the concentration of the one or more aminophenol compounds, augmented compositions can be distributed in the soil without further modification or can be considered as concentrates and subsequently diluted with additional inert carrier to produce the ultimate treating composition. The required amount of the one or more aminophenol compounds can be supplied to growth media in from about 1 to about 50 gallons of organic solvent carrier, in from about 5 to about 27,000 or more gallons of aqueous carrier or in from about 20 to about 2000 pounds of solid carrier per acre treated. When an organic solvent carrier is employed, it can be further dispersed in the above volume of aqueous liquid carrier.

Liquid compositions containing the desired amount of one or more aminophenol compounds can be prepared by dispersing the latter in one or more liquid carriers, such as water or an organic solvent, with or without the aid of a suitable surface active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media. Dispersing and emulsifying agents which can be employed in liquid compositions include condensation products of alkylene oxides with phenols and organic acids, alkyl aryl sulfonates, polyoxyalkylene derivatives of sorbitol esters, sugar esters, complex other alcohols, mahogany soaps and the like. The surface active agents are generally employed in the amount of from about 1 to about 20 percent by weight of one or more aminophenol compounds based on the total weight of the composition and preferably from about 1 to about 10 percent on the same basis.

Solid compositions containing the active one or more aminophenol compounds can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with one or more solid aminophenol compounds, wet with one or more liquid aminophenol compounds or wet with a solution or dispersion of one or more solid or liquid aminophenol compounds in a volatile organic solvent. Depending upon the proportions of ingredients, these compositions can be employed without further modification, or can be considered concentrates and subsequently further diluted with solid surface active dispersing agents, talc, chalk, gypsum or the like, to obtain the desired treating composition. Furthermore, such concentrate compositions can be dispersed in water with or without added dispersing agent or agents to prepare aqueous soil treating compositions.

While the composition and method of this invention are particularly suited for agricultural applications for prevention or inhibition of soil urease catalyzed hydrolysis of urea, they can also be used in other applications where inhibition of the activity of urease is desired. For example, such other applications include use in animal litters, as feed additives, pharmaceutical applications, diaper treatment, urease inhibition in mammalian urinary tracts and the like. It should be noted that while it is believed that all of the aminophenol compounds exhibit some level of urease inhibiting activity, the particular active compound employed in one application may not be useful in another application. Thus, in the selection of a particular active material for use in an application, such factors as toxicity of the material, the environment in which the material is to be used, the level of urease inhibition desired and the like must be considered in selecting such material.

The novel aminophenol compounds of this invention which are useful as urease inhibitors in the composition and method of this invention are those of the formula:

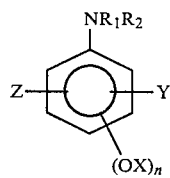

and acid salts thereof,
wherein:
n is 1, 2 or 3;
X is hydrogen or a metal cation;
Z and Y are the same or different and are hydrogen, or alkyl, aryl, heterocycle, nitro, cyano, halogen, alkylmercapto, trihalomethyl, mercapto, hydroxy, amino, carboxy, carbamyl, sulfonic acid, alkylamino, dialkylamino, or phenoxy substituents; or Z and Y together may form an alkylene or alkenylene chain which may optionally include one or more heteroatoms of divalent oxygen, nitrogen, sulfur, sulfinyl or sulfonyl to form a fused or spiro aliphatic, aromatic or heterocyclic ring structure; and $R_1$ and $R_2$ are the same or different and are hydrogen, alkyl, phenyl, or alkyl or phenyl substituted with one or more halogen, alkoxy, cyano, aryloxy, acyloxy, nitro, amido, isocyano, mercapto, isocyanato, alkylmercapto, arylmercapto, thiocyano, carboxy, quaternary ammonium radical, amino, carboxyalkyl, alkylamino, dialkylamino, bis-carboxyalkyl, alkylcarbonyl, arylcarbonyl or alkoxycarbonyl; or $R_1$ and $R_2$ together may form an alkylene chain completing a 3, 4, 5, or 6 membered ring structure; or $R_1$, $R_2$ and N together may form an iminoaliphatic, iminocycloaliphatic or iminoaromatic group.

Illustrative of permissible $R_1$ and $R_2$ substituents are hydrogen, methyl, ethyl, propyl, hexyl, isopropyl, dodecyl, and substituted straight and branched chain alkyl such as 2-chloroethyl, 3-chloropropyl, 4-chlorobutyl, 3-iodopropyl, 2-cyanoethyl, iodomethyl, 2-phenoxyethyl, 3-bromopentyl, 5-chloropentyl, 2-methoxyneopentyl, 2-iodo-2-phenylethyl, 4-isopropoxyethyl, 2-naphthoxyethyl, 2,2-dichloropropyl, 3-mercaptobutyl, 2-acetylpropyl, cyclopropyl, cyclopentyl, phenylmercaptomethyl, cyclohexyl, dichlorocyclohexyl, phenoxyethyl, thiocyanoethyl, isocyanoethyl, isocyanatopropyl, aminopropyl, dimethylaminoethyl, methylaminohexyl, caproylmethyl, methoxycarbonylethyl 1-chloro-prop-2-enyl, 2-cyano-but-3-enyl, 3-methoxy-pent-4-enyl, 1-iodo-2,2-dimethylprop-2-enyl, and the like; and substituted phenyl such as 4-methylphenyl, 2,4-dimethylphenyl, 4-trifluoromethylphenyl, 2,4-dichlorophenyl, 4-acetylphenyl, 3-carboxymethylphenyl, 4-mercaptophenyl, 3,5-dichlorophenyl, 2-cyanophenyl, 4-phenylmercaptophenyl, 2-methoxycarbonylphenyl, 2-aminophenyl, 2-dimethylaminophenyl, 4-phenoxyphenyl and the like.

Exemplary of permissible Z and Y substituents are amino, dimethylamino, ethoxy, ethyl, methoxy, chloro, bromo, carbamyl, carboxy, cyano, iodo, fluoro, acetyl, acetoxy, 2-hydroxyethyl, 4-cyanophenyl, 2,4-dichlorophenyl, trihalomethyl, hydroxy, phenoxy or the like.

The following compounds are illustrative of aminophenol compounds within the scope of the generic formula set forth above which can be prepared in accordance with the procedures set forth hereinbelow and which can be employed in the practice of this invention.
2,3-dimethyl-4-aminophenol
4-methyl-2-aminophenol
2,6-diethyl-4-aminophenol
2-methyl-6-propyl-4-aminophenol
3,5-dipropyl-2-aminophenol
5-isopropyl-3-aminophenol
2,5-dimethyl-3-aminophenol
6-methyl-2,4-diaminophenol
5-chloro-2-amino-4-(N-methylamino)phenol
6-methoxy-2,4-bis-(N-methylamino)phenol
6-dimethylamino-4-aminophenol
1-hydroxy-4-amino-5,6,7,8-tetrahydronaphthalene
1-hydroxy-4-amino-1-naphthalene
2-cyano-4-(N,N-dimethylamino)phenol
4-amino-7-hydroxy-2,3-benzofuran
5-hydroxy-8-aminocoumarin
5-(dimethylamino)-8-hydroxyquinoline
4-amino-7-hydroxy-2,1,3-benzothiadiazole
1-amino-4-hydroxyanthraquinone
4-amino-5-hydroxy-1-naphthalenesulfonic acid
2-mercapto-4-aminophenol
3-methylmercapto-2-aminophenol
4-trichloromethyl-3-aminophenol
4-amino-5-hydroxy-1-benzothiophene
N-cyanomethyl-4-aminophenol
N,N-dimethyl-4-aminophenol
N,N-bis-(2'-cyanoethyl)-2-aminophenol
N-(2'-thiocyanophenyl)-4-aminophenol
N-(2',4'-dichlorophenyl)-3-aminophenol
N-methyl-2,4-dihydroxyaniline
N-(4'-cyanophenyl)-2,6-diaminophenol
N-(4'-acetylphenyl)-4-aminophenol
N-(2'-carboxymethyl)-2-aminophenol
N-(3'-methylmercaptoethyl)-4-aminophenol
N-(3'-dimethylaminopropyl)-4-aminophenol
3-amino-2-hydroxybenzoic acid
3-hydroxy-2-aminobenzamide
5-aminosalicylate, sodium salt
2-phenoxy-4-aminophenol
3-amino-4-hydroxybiphenyl
4,4'-dihydroxydiphenylamine 3-cyano-4-hydroxy-3'-chlorodiphenylamine
indophenol
indophenol sodium salt
2,6-dibromoindophenol sodium salt Preferred for use in the practice of this invention are aminophenol compounds in which:

n is 1 or 2;

X is hydrogen or an alkali metal cation;

Z and Y are individually halogen, as for example chloro and bromo; hydrogen; alkyl having from 1 to about 7 carbon atoms, as for example, methyl, ethyl and the like; trifluoromethyl; cyano; carboalkoxy, such as carbomethoxy, carboethoxy and the like; hydroxy; and alkoxy, such as methoxy, ethoxy and the like; and $R_1$ and $R_2$ are the same or different and are hydrogen, straight or branched chain alkyl, as for example methyl, ethyl, isopropyl, neopentyl, butyl and the like; phenyl or substituted phenyl such as 4-halophenyl, 2,4-dialkyl phenyl, 4-trifluoromethylphenyl, and the like, carboxyalkyl, such as carboxymethyl, carboxyethyl and the like; carboxy, or $R_1$ and $R_2$ together form an alkylene chain forming a ring structure, as for example, piperidine, pyrrolidine and the like.

Particularly preferred for use in this invention are compounds in which:

n is 1;

X is hydrogen or an alkali metal cation;

Z and Y are individually hydrogen, methyl, ethyl, methoxy, ethoxy, carboxy, cyano, chloro, bromo or fluoro; and $R_1$ and $R_2$ are the same or different and are hydrogen, carboxy, phenyl, methyl, ethyl, propyl or butyl.

Amongst these particularly preferred embodiments of the invention most preferred are those embodiments in which the one or more p-aminophenol compounds are of the formula

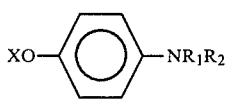

and acid salts thereof,
wherein:

X is hydrogen or an alkali metal cation; and $R_1$ and $R_2$ are the same or different and are straight or branched chain alkyl, hydrogen, carboxy, alkyl, phenyl, or $R_1$ and $R_2$ together may form an alkylene chain completing a 3, 4, 5 or 6 membered ring structure.

Especially effacious compounds for use in the practice of this invention are 2-aminophenol, 4-aminophenol, 4-(N-methylamino)phenol, 4-(N,N-dimethylamino)phenol hydrochloride, 4-(methylamino)phenol sulfate, 4-(N-phenyl)aminophenol, 4'-hydroxybenzanilide and N-(4-hydroxyphenyl)glycine.

Compounds for use in the practice of this invention can be prepared in accordance with known procedures. For example, useful aminophenol compounds can be prepared by the reduction of nitrophenols, nitrosophenols and hydroxyazo compounds. By using ammonium sulfide or some other mild reducing agent it is generally possible to reduce di- and tri-nitrophenols to aminonitrophenols. 4-Aminophenols are formed by the rearrangement of arylhydroxylamines under the influence of dilute sulfuric acid. A variation of this method consists in the electrochemical reduction of nitro compounds in sulfuric acid; under the special conditions of the reduction an arylhydroxylamine is an intermediate product. Aminophenols can also be prepared by replacement of the halogen in halogen-substituted phenols by the action of ammonia in presence of cupric salts. Some aminophenols, e.g. 3-aminophenol, are formed by replacement of one hydroxyl group in di- and trihydric phenols by an amino group by heating with ammonium chloride and aqueous ammonia at 200° C.

More particularly, 2-aminophenol can be prepared by the reduction of 2-nitrophenol, for which purpose sodium hydrosulfite in boiling alkaline solution, sodium sulfite, zinc dust and boiling water containing a little calcium chloride (E. Bamberger, Chem. Ber., 1895, 28, p. 251), and catalytic hydrogenation have been used. When 2-aminophenol is heated with acylating or alkylating reagents, the amino group is generally substituted first. Methylation of 2-aminophenol yields 2-(N,N-dimethylamino)phenol, (m.p. 44° C., b.p. 200° C.), and a 2-hydroxyphenyltrimethylammonium salt (P. Griess, Chem. Ber., 1880, 13, p. 246; J. Pinnow, Chem. Ber., 1899, 32, p. 1405; J. von Braun, ibid., 1916, 49, p. 1105).

2-Methylaminophenol (m.p. 90° C.) is best prepared by the demethylation of methyl-o-anisidine.

2-Formamidophenol (m.p. 129° C.) is prepared by heating 2-aminophenol and formic acid (E. Bamberger, Chem. Ber., 1903, 36, p. 2052) and is formed together with anthranil by the oxidation of 2-aminobenzaldehyde with neutral permonosulfuric acid. 2-Acetamidophenol (m.p. 201° C.) is formed by the regulated acetylation of 2-aminophenol, by dissolving 2-acetamidophenol in caustic soda solution (Bamberger, loc. cit.) or by the reduction of 2-nitrophenol with tin and acetic acid (J. B. Tingle and L. F. Williams, Amer. Chem. J., 1907, 37, p. 57).

2-Benzamidophenol is formed by the reduction of 2-nitrophenyl benzoate. (A. Einhorn, Ann., 1900, 311, p. 39; W. Bottcher, Chem. Ber., 1883, 16, p. 629); or by the alkaline hydrolysis of 2-acetamidophenyl benzoate (F. Bell, J. Chem. Soc., 1931, p. 2962).

2-Aminophenyl ethyl carbonate can be prepared by the reduction of o-nitrophenylcarbonic ester (J. H. J. Stieglitz and H. T. Upson, ibid., 1904, 31, p. 458; A. L. Le Rosen and E. D. Smith, J. Amer. Chem. Soc., 1948, 70, p. 2705). Other examples of this migration are recorded (e.g. F. Bell, J. Chem. Soc., 1931, p. 2962; N. N. Crounse and L. C. Raiford, J. Org. Chem., 1945, 10, p. 419; Raiford and K. Alexander, ibid., 1940, 5, p. 300; Raiford and A. L. Le Rosen, J. Amer. Chem. Soc., 1945, 67, p. 2163).

2-Hydroxyphenylurea (m.p. 154° C.); 2-hydroxyphenylthiourea (m.p. 161° C.) and 2-hydroxydiphenylamine (m.p. 70°), are obtained by the action of acetyl or benzoyl peroxide on diphenylamine (S. Gambarjan, Chem. Ber., 1909, 42, p. 4003).

2-Aminophenol condenses with benzaldehyde to give 2-benzylideneaminophenol, m.p. 89° C. (A. Pictet and H. J. Ankersmit, Ann., 1891, 266, p. 140; for other useful condensations see F. G. Pope, J. Chem. Soc., 1908, 93, p. 534).

Anhydrous 2-amino-4-nitrophenol (m.p. 146° C.) can be prepared by the reduction of 2,4-dinitrophenol with alkali sulfide (W. W. Hartmann and H. L. Silloway, Org. Synth., 1945, 25, p. 5).

2-Amino-5-nitrophenol (m.p. 204° C.) and 2-amino-6-nitrophenol (m.p. 113° C.) can be prepared by the procedures described in L. F. Hewitt and H. King, J. Chem. Soc., 1926, p. 822; 1927, p. 1059; and G. Newberry and M. A. Phillips, ibid., 1928, p. 121.

Picramic acid, 2-amino-4,6-dinitrophenol, dark red needles (m.p. 170° C.), is formed by the reduction of picric acid under a wide variety of conditions, e.g. with zinc dust and aqueous ammonia (J. Aloy and A. Frebault, Bull. Soc. Chim. Fr., 1904, 33, p. 496), alcoholic ammonium sulfide or aqueous sodium sulfide (K. Brand, J. Prakt. Chem., 1906, 74, p. 471), iron and aqueous ferric chloride or sodium chloride (R. E. Lyons and L. T. Smith, Chem. Ber., 1927, 60, p. 180). Further reduction yields 2,6-diamino-4-nitrophenol and 2,4,6-triaminophenol (F. L. English, Ind. Eng. Chem., 1920, 12, p. 997). With potassium cyanide in aqueous solution it yields 2-hydroxylamino-3-hydroxy-6-nitrobenzonitrile and 4-amino-3-hydroxy-2,6-dinitrobenzonitrile (W. Borsche and A. Heyde, Chem. Ber., 1905, 38, p. 3938).

All the mono-nitro derivatives of o-aminophenol are known. For example, 3-nitro-2-aminophenol (m.p. 216°–217° C.) (H. King, J. Chem. Soc., 1927, p. 1058); 4-nitro-2-aminophenol, +$H_2O$ (m.p. 80°–90° C.) anhyd. (m.p. 142°–143° C.) (W. W. Hartman and H. L. Silloway, Org. Synth., 1935, 25, p. 5); 5-Nitro-2-aminophenol (m.p. 203°–204° C.) (L. F. Hewitt and H. King, J. Chem. Soc., 1926, p. 822); 6-nitro-2-aminophenol (m.p. 111°–112° C.); (P. E. Verkade and P. H. Witjens, Rec. Trav. Chim., 1943, 62, 204; 1946, 65, p. 361).

3-Aminophenol (m.p. 122° C.) is prepared (1) by reduction of 3-nitrophenol, (2) by the alkali fusion of metanilic acid (R. Meyer and W. Sundmacher, Chem. Ber., 1899, 32, p. 2113), (3) by heating resorcinol with ammonia and ammonium bisulfite at 100° C. (German Pat. No. 117,471) or with aqueous ammonia and ammonium chloride at 200° C. (German Pat. No. 49,060). 3-Aminophenol diazotises normally, and when it is alkylated or acylated the amino group is attached preferentially. It can be brominated to yield 3-amino-2,4,6-tribromophenol (m.p. 119° C.) (E. Bamberger, Chem. Ber., 1915, 48, p. 1356).

3-(N-Methylamino)phenol (b.p. 170° C./12 mm) and 3-ethylaminophenol (m.p. 62° C., b.p. 176° C./12 mm), are prepared by the alkali fusion of the corresponding 3-alkylaminobenzenesulfonic acid. This same method is used for the preparation of 3-(N,N-dimethylamino)-phenol (m.p. 85° C., b.p. 268° C.) and of 3-(N,N-diethylamino)phenol (m.p. 78° C., b.p. 278° C.), which may also be obtained by heating resorcinol with the appropriate dialkylamine and its sulfite in aqueous solution at 125° C. (German Pat. No. 121,683). 3-Amino-4-nitrophenol, (m.p. 185°–186° C.); 2-amino-5-nitrophenol (m.p. 165° C.) and 6-nitro-3-aminophenol (m.p. 162° C.), can be prepared by the procedure of R. Meldola et al., J. Chem. Soc., 1906, 89, p. 924).

4-Aminophenol (m.p. 184° C.) (dec.), is prepared by (1) reduction of 4-nitrophenol, 4-nitrosophenol, p-azophenol, or of 4-hydroxyazobenzene; (2) heating 4-chlorophenol with aqueous ammonia and a little copper sulfate at 140° C. (British Pat. No. 4044); (3) rearrangement of β-phenylhydroxylamine with aqueous sulfuric acid; the direct formation of 4-aminophenol from nitrobenzene by the action of zinc dust on a sulfuric acid solution (German Pat. No. 96,853), or by electrolytic reduction in diluted sulfuric acid (L. Gattermann Chem. Ber., 1893, 26, p. 1847; British Pat. No. 18,081; German Pat. No. 154,086) depends presumably on the intermediate formation of β-phenylhydroxylamine; (4) decarboxylation of 5-aminosalicylic acid; (5) the dealkylation of 4-aminoalkoxybenzenes by 65% sulfuric acid at 160° C. (British Pat. No. 293,792).

4-N-(Methylamino)phenol (m.p. 85° C.) is formed by heating 4-chlorophenol with aqueous methylamine and a little copper sulfate at 135° C. (German Pat. No. 205,415) or by heating hydroquinone with alcoholic methylamine at 200°–250° C. (R. N. Harger, J. Amer. Chem. Soc., 1919, 41, p. 273). It has also been obtained by the decarboxylation of 4-hydroxyphenylglycine (U.S. Pat. Nos. 1,844,844 and 1,844,926).

4-Dimethylaminophenol (m.p. 76° C.) is formed together with 4-hydroxyphenyltrimethylammonium iodide by the methylation of 4-aminophenol by methyl iodide. This compound is also formed by the distillation of 4-hydroxyphenyltrimethylammonium chloride or iodide, or the corresponding base.

4-Hydroxydiphenylamine (m.p. 70° C., b.p. 330° C.) is formed by heating hydroquinone with aniline and zinc chloride at 180°–185° C. (G. Heller, Ann., 1919, 418, p. 265; A. Calm and M. Phillip, Chem. Ber., 1883, 16, p. 1799; 1884, 17, p. 2431), or by reaction of p-aminophenol with bromobenzene and cuprous iodide (German Pat. No. 187,870). 4-Amino-2-nitrophenol (dark red plates, m.p. 128° C.) can be prepared by the procedure described in A. Girard, Bull. Soc. Chim. Fr., 1924, 35, p. 773) and 4-Amino-3-nitrophenol (m.p. 154° C.), can be formed from the nitration of 4-aminophenyl acetate as described in (Girard, loc. cit.);

4-Amino-2,5-dinitrophenol, dark violet needles (m.p. 166° C.) is prepared in accordance with the procedure described in Girard, loc. cit. 4-Amino-3,5-dinitrophenol (m.p. 230° C.), and 4-amino-2,3,5-trinitrophenol (m.p. 127° C.) are prepared by the procedure described in (F. Reverdin, Helv. Chim. Acta., 1926, 9, p. 796; 1929, 12, p. 117; and H. F. J. Lorang, Rec. Trav. Chim., 1927, 46, p. 642).

2,4-Dinitro-4'-hydroxydiphenylamine, (red needles, m.p. 190° C.), is obtained from 4-aminophenol and chloro-2,4-dinitrobenzene by heating in alcohol containing sodium acetate (R. Meldola et al., J. Chem. Soc., 1917, 111, p. 546). 4,4'-Dihydroxydiphenylamine (m.p. 174° C.), is obtained by heating 4-aminophenol with hydroquinone or by the action of ammonia on quinone (F. Schneider, Chem. Ber., 1899, 32, p. 689). 4-Amino-4'-hydroxydiphenylamine (m.p. 166° C.) is obtained from the reduction of the corresponding nitro compound (F. Ullmann, Chem. Ber., 1909, 42, p. 1080), or by oxidizing a mixture of p-phenylenediamine and phenol with hypochlorite in presence of a copper salt (German Pat. No. 204,596).

2,4-Diaminophenol is prepared by the catalytic hydrogenation of 2,4-dinitrophenol or less conveniently be reduction in acid solution by metals. It is also formed by the electrolytic reduction of 3-dinitrobenzene or 3-nitroaniline in sulfuric acid (L. Gatterman, Chem. Ber., 1893, 26, p. 1848). 2,6-Diaminophenol is formed by the reduction of 2,6-dinitrophenol (J. Post and C. Stuckenberg, Ann., 1880, 205, p. 79). 2,5-Diaminophenol and 4,5-diaminophenol and prepared from the corresponding nitroaminophenol (F. Kehrmann, Chem. Ber., 1897, 30, p. 2096; 1898, 31, p. 2403). 3,5-Diaminophenol (m.p. 168°–170° C.) is formed from phloroglucinol and aqueous ammonia (J. Pollak, Monatsh, 1893, 14, p. 425).

The following specific examples are presented to more particularly illustrate the invention.

EXAMPLE

Urease Inhibition Efficacy Test

Efficacy tests were conducted to evaluate the efficacy of certain representative aminophenol compounds as urease inhibitors. The inhibition tests were run in New York soil (Cazenovia silt loam, pH 7.0) or in Wisconsin soil (Plano silt loam, pH 5.4)

Evaluations (run in triplicate) consisted of applying 800 micrograms of the test compound in 5 ml of water and 42.8 mg of urea in 1 mL of water to 20 g of air-dry soil in a glass bottle. The bottle was capped with perforated aluminum foil and incubated at 25° C.C for three days prior to extraction with 100 mL of a 2M KCl solution containing 0.5 mg of phenylmercuric acetate. The extracts were then analyzed for remaining urea using an autoanalyzer. Percent inhibition was calculated as % Inhibition $=[1-(A-B/A-C)] \times 100$ where A is urea recovered from unincubated sample (urea added to soil and immediately extracted); B is urea recovered from inhibited sample; and C is urea recovered from the control (uninhibited sample).

The results of these tests are set forth in the following TABLE I.

TABLE I

| Experiment No. | Compound | % Inhibition 40 micrograms per gram soil | |
|---|---|---|---|
| | | Cazenovia pH 7.0 | Wisconsin pH 5.4 |
| 1 | 2-aminophenol | 8 | — |
| 2 | 4-aminophenol | 46 | — |
| 3 | 4-(N—methylamino)phenol sulfate | 82 | 55 |
| 4 | 4-(N,N—dimethylamino)-phenol hydrochloride | 77 | 49 |
| 5 | 4-(N—phenyl)aminophenol | 69 | 53 |
| 6 | 4'-Hydroxybenzanilide | 50 | 14 |
| 7 | N—(4-Hydroxyphenyl)glycine | 82 | 61 |
| 8 | 2,6-Dichloroiminophenol, sodium salt | 69 | — |

What is claimed is:

1. An composition comprising an acceptable carrier urease inhibiting effective amount of one or more aminophenol compounds of the formula:

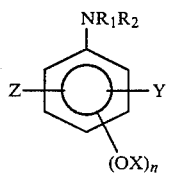

and acid salts thereof,
wherein:
n is 1, 2 or 3;
X is hydrogen or a metal cation;
Z and Y are the same or different and are hydrogen, alkyl, aryl, heterocycle, nitro, cyano, halogen, trihalomethyl, carbamyl, sulfonic acid, mercapto, hydroxy, amino, alkylmercapto, alkylamino, carboxyl, dialkylamino or phenoxy; or Z and Y together may form an alkylene or alkenylene chain which may optionally include one or more heteroatoms of divalent oxygen, nitrogen, sulfur, sulfinyl or sulfonyl to form a fused or spiro aliphatic, aromatic or heterocyclic ring structure; and $R_1$ and $R_2$ are the same or different and are hydrogen, or substituted or unsubstituted alkyl or phenyl wherein permissible substituents are one or more halogens, alkoxy, cyano, aryloxy, acyloxy, nitro, mercapto, alkylmercapto, and arylmercapto, thiocyano, amido, quaternary ammonium radical, amino, alkylamino, dialkylamino, alkylcarbonyl, arylcarbonyl, alkoxycarbonyl, carboxy, carboxyalkyl, bis-carboxyalkyl, or $R_1$ and $R_2$ together may form an alkylene chain completing a 3, 4, 5 or 6 membered ring structure or $R_1$, $R_2$ and N together may form an iminoaliphatic, iminocycloaliphatic or iminoaromatic group.

2. A composition according to claim 1 wherein said urease inhibiting amounts is at least about 0.0001 weight percent based on the total weight of the composition.

3. A composition according to claim 2 wherein said amount is from about 0.0001 to about 98 weight percent.

4. A composition according to claim 3 wherein said amount is from about 0.002 to about 50 weight percent.

5. A composition accordng to claim 4 wherein said amount is from about 0.01 to about 20 weight percent.

6. A composition according to claim 1 wherein Z and Y are individually halogen, hydrogen, alkyl having from 1 to about 7 carbon atoms, alkoxy having from 1 to about 7 carbon atoms, carboalkoxy having from 2 to about 8 carbon atoms, cyano, nitro, amino, trifluoromethyl and hydroxy, or Z and Y together form and alkylene or alkenylene chain completing a 4, 5, or 6 membered ring structure.

7. A composition according to claim 6 wherein Z and Y are individually hydrogen, amino, hydroxy, nitro, methyl, ethyl, methoxy, ethoxy and cyano.

8. A composition according to claim 7 wherein X and Y are individually hydrogen, amino, nitro, or hydroxy.

9. A composition according to claim 8 wherein Z and Y are hydrogen.

10. A composition according to claim 1 wherein $R_1$ and $R_2$ are the same or different and are hydrogen, alkyl, phenyl, carboxyalkyl, or $R_1$ and $R_2$ together may form an alkylene chain completing a 3, 4, 5, or 6 membered ring structure or $R_1$, $R_2$ and N together form iminocycloaliphatic group.

11. A composition according to claim 10 wherein $R_1$ and $R_2$, are the same or different and are hydrogen, methyl, ethyl, carboxymethyl, carboxyethyl and phenyl.

12. A composition according to claim 11 wherein $R_1$ and $R_2$ are the same or different and are methyl, hydrogen, phenyl or carboxymethyl.

13. A composition according to claim 1 wherein said compound is the acid salt of a strong inorganic acid.

14. A composition according to claim 13 wherein said compound is a salt of hydrochloric acid or sulfuric acid.

15. A composition according to claim 1 wherein X is hydrogen.

16. A composition according to claim 15 wherein X is a metal cation.

17. A composition according to claim 16 wherein said metal cation is an alkali metal cation.

18. A composition according to claim 1 wherein n is 1.

19. A composition according to claim 1 wherein said —$(OX)_n$ group is substituted in the para positions relative to the amino group.

20. A composition according to claim 16 wherein said compound is of the formula:

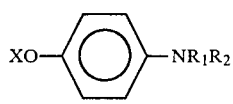

or acid salts thereof,
wherein:
X is hydrogen or an alkali metal cation; and
$R_1$ and $R_2$ are the same or different and are phenyl, hydrogen, alkyl, carboxyalkyl, or $R_1$ and $R_2$ together form an alkylene chain completing a 3, 4, 5 or 6 membered ring structure, or $R_1$, $R_2$ and N together form an iminocycloaliphatic group.

21. A composition according to claim 2 wherein $R_1$ and $R_2$ are the same or different and are hydrogen, carboxymethyl, carboxyethyl, methyl, ethyl, phenyl or $R_1$ and $R_2$ together form an alkylene chain completing a 5 or 6 membered structure or $R_1$, $R_2$ and N together form a iminocycloaliphatic group.

22. A composition according to claim 1 wherein said compounds are selected from the group consisting of 2-aminophenol, 4-aminophenol, 4-(N-methylamino)phenol sulfate, 4-(N,N-dimethylamino)phenol hydrochloride, 4-(N-phenyl)aminophenol, 4'-hydroxybenzanilide and N-(4-hydroxyphenyl)glycine.

23. A composition according to claim 20 wherein said compounds are selected from the group consisting of 4-(N-methylamino)phenol sulfate, 4-(N,N-dimethylamino)phenol hydrochloride, 4-(N-phenyl)aminophenol, and N-(4-hydroxyphenyl)glycine.

24. A fertilizer composition comprising urea or one or more urea precursor compounds capable of forming urea when subjected to the use conditions of the composition and a urease inhibiting effective amount of one or more aminophenol compounds of the formula:

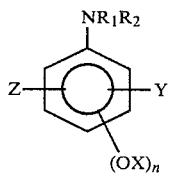

and acid salts thereof,
wherein:
n is 1, 2 or 3;
X is hydrogen or a metal cation;
Z and Y are the same or different and are hydrogen, alkyl, aryl, heterocycle, nitro, cyano, carbonyl, carbamyl, sulfonic acid, halogen, trihalomethyl, mercapto, hydroxy, amino, alkylamino, alkylmercapto, dialkylamino, phenoxy, or Z and Y together may form an alkylene or alkenylene chain which may optionally include one or more heteroatoms of divalent oxygen, nitrogen, sulfur, sulfinyl or sulfonyl to form a fused or spiro aliphatic, aromatic or heterocyclic ring structure; and
$R_1$ and $R_2$ are the same or different and are hydrogen, alkyl, phenyl, or phenyl or alkyl substituted with one or more halogen, alkoxy, cyano, aryloxy, acyloxy, nitro, mercapto, alkylmercapto, arylmercapto, thiocyano, amido, quaternary ammonium radical, amino, alkylamino, dialkylamino, alkylcarbonyl, arylcarbonyl or alkoxycarbonyl, carboxyalkyl, or bis-carboxyalkyl, or $R_1$ and $R_2$ together may form an alkylene chain completing a 3, 4, 5, or 6 membered ring structure, or $R_1$, $R_2$ and N together may form an iminoaliphatic, iminoaromatic or iminocycloaliphatic group.

25. A method of enhancing plant growth and crop yield which comprises distributing an effective amount of the composition according to claim 1 in a plant growth media.

26. A method of inhibiting the urease catalyzed hydrolysis of urea at a situs which comprises applying to said situs a urease inhibiting effective amount of one or more compounds of the formula:

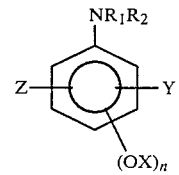

and acid salts thereof,
wherein:
n is 1, 2 or 3;
X is hydrogen or a metal cation;
Z and Y are the same or different and are hydrogen, alkyl, aryl, heterocycle, nitro, cyano, halogen, carbamyl, trihalomethyl, mercapto, carbonyl, sulfonic acid, hydroxy, amino, alkylamino, alkylmercapto, dialkylamino, phenoxy, or Z and Y together may form an alkylene or alkenylene chain which may optionally include one or more heteroatoms of divalent oxygen, nitrogen, sulfur, sulfinyl or sulfonyl to form a fused or spiro aliphatic, aromatic or heterocyclic ring structure; and
$R_1$ and $R_2$ are the same or different and are hydrogen, alkyl, phenyl or alkyl or phenyl substituted with one or more halogens, alkoxy, cyano, aryloxy, acyloxy, nitro, amido, mercapto, alkylmercapto, or arylmercapto, thiocyano, quaternary ammonium radical, amino, alkylamino, dialkylamino, alkylcarbonyl, arylcarbonyl, alkoxycarbonyl, carboxy, carboxyalkyl, bis-carboxyalkyl, or $R_1$ and $R_2$ together may form an alkylene chain completing a 3, 4, 5 or 6 membered ring structure, or $R_1$, $R_2$ and N together may form an iminoaliphatic, iminocycloaliphatic or iminoaromatic.

27. A method according to claim 26 wherein said situs is a plant growth media.

28. A method according to claim 27 wherein said urease inhibiting effective amount is at least about 0.01 p.p.m.

29. A method according to claim 28 wherein said urease inhibiting effective amount is from about 0.01 p.p.m. to about 5,000 p.p.m.

30. A method according to claim 29 wherein said urease inhibiting effective amount is from about 0.2 p.p.m. to about 1000 p.p.m.

31. A method according to claim 30 wherein said urease inhibiting effective amount is from about 1 p.p.m. to about 500 p.p.m.

32. A composition according to claim 1 wherein said carrier is a liquid.

33. A composition according to claim 32 wherein said liquid carrier is selected from the group consisting of water and organic liquids.

34. A composition according to claim 1 wherein said carrier is a finely divided inert solid.

* * * * *